United States Patent [19]

Paullin

[11] 4,231,622
[45] Nov. 4, 1980

[54] TAPERED BEARING KIT FOR INTERMEDIATE GEAR

[76] Inventor: Grover G. Paullin, 13 E. Washington Ave., Yakima, Wash. 98903

[21] Appl. No.: 21,434

[22] Filed: Mar. 16, 1979

[51] Int. Cl.³ .................... F16C 19/14; F16C 25/06
[52] U.S. Cl. ................................ 308/22; 308/178; 308/207 A; 74/606 R
[58] Field of Search ............ 308/22, 178, 183, 207 R, 308/207 A, 211, 214; 74/606 R

[56] References Cited

U.S. PATENT DOCUMENTS

| | | | |
|---|---|---|---|
| 1,671,682 | 5/1928 | Norris | 308/207 A |
| 1,872,814 | 8/1932 | Riblet | 308/207 R |
| 2,346,950 | 4/1944 | Strehlow | 308/211 |
| 2,356,506 | 8/1944 | Clausen | 308/207 R |
| 2,653,538 | 9/1953 | Peyrebrune | 308/207 A |
| 2,880,041 | 3/1959 | Brownyer | 308/207 R |

*Primary Examiner*—Richard R. Stearns
*Attorney, Agent, or Firm*—Clarence O'Brien; Harvey B. Jacobson

[57] ABSTRACT

A kit for converting the rotatable supporting structure for an intermediate gear employed in a gear box or transfer case such as those used in certain commercially available four wheel drive vehicles and the like from a loose needle bearing support for journaling the intermediate gear from its supporting shaft to a tapered roller bearing support with the kit including a pair of tapered bearing assemblies, a spacer positioned therebetween, bushings received in the transfer case bosses, thrust washers between the bushings and the bearings and a bolt-type shaft having a polygonal head at one end and a lock nut at the other to retain the components in assembled relation and to preload the bearings in the intermediate gear by applying a predetermined torque on the lock nut while holding the bolt stationary. The kit enables conversion from loose needle bearing assemblies for the intermediate gear to a tapered roller bearing arrangement without any modification whatsoever to the transfer case or the intermediate gear which results in reduction of friction and noise at high rotational speeds and enabling less expensive replacement as compared to the loose needle bearing arrangements.

5 Claims, 2 Drawing Figures

TAPERED BEARING KIT FOR INTERMEDIATE GEAR

BACKGROUND OF THE INVENTION

1. Field of the Invention

The present invention generally relates to the conversion of the supporting structure for an intermediate gear in a gear box or transfer case from a structure utilizing loose needle bearing assemblies for supporting the intermediate gear rotatably on a shaft anchored to the transfer case to a tapered roller bearing assembly rotatably supporting the intermediate gear from a bolt-type shaft anchored to the transfer case without any mechanical modification of the transfer case with the same lock plate being used to retain the tapered bearing assembly and bolt-type shaft in place in the transfer case to enable the conversion to be completed without requiring any machine work or other modification to the transfer case.

2. Disclosure Statement

In many commercially available vehicles, especially four wheel drive vehicles, the intermediate gear in the gear box or transfer case is supported from the intermediate shaft by loose needle bearings with the internal bore of the intermediate gear serving as an outer race for the needle bearings and the external surface of the intermediate shaft serving as an inner race for the needle bearings. This arrangement creates a large bearing surface resulting in unnecessary friction and noise at high RPM and also results in considerable wear of the needle bearings themselves, the inner race (the external surface of the intermediate shaft) and the outer race (the internal bore of the intermediate gear) thereby resulting in an expensive replacement. This problem is especially significant when such vehicles are used over roadways and the like at relatively high speeds.

Also known are various types of bearing structures to support two components rotatably in relation to each other. Many installations utilize oppositely disposed tapered roller bearings with a retaining nut to retain the bearings in place and tighten the bearings to a predetermined degree. The following U.S. patents disclose tapered roller bearing assemblies for various purposes and constitutes the prior art known to applicant.

U.S. Pat. No. 2,407,532—Sep. 10, 1946—Boden
U.S. Pat. No. 2,826,466—Mar. 11, 1958—Pritchard
U.S. Pat. No. 3,716,280—Feb. 13, 1973—Leibensperger et al.
U.S. Pat. No. 3,804,477—Apr. 16, 1974—Allmandinger et al.
U.S. Pat. No. 3,896,684—July 29, 1975—Duer
U.S. Pat. No. 3,915,032—Oct. 28, 1975—Ottemann
U.S. Pat. No. 3,929,036—Dec. 30, 1975—Shealy
U.S. Pat. No. 4,023,868—May 17, 1977—Miki
U.S. Pat. No. 4,061,377—Dec. 6, 1977—Nordstrom Even though various bearing arrangements are known to support one member rotatably in relation to another, to-date, the only solution to the problems occurring with respect to rotatably supporting an intermediate gear in a transfer case in the types of vehicles mentioned above has been the replacement of the components with similar components, that is, the replacement of the worn needle bearings, intermediate gear and intermediate gear shaft with new components of the same type.

SUMMARY OF THE INVENTION

An object of the present invention is to provide a tapered roller bearing kit for use in replacing the loose needle bearing assemblies normally used to rotatably journal an intermediate gear on an intermediate gear shaft supported from the opposed walls of a transfer case in a manner that no machine work or modification whatsoever has to be performed on the transfer case thereby enabling the conversion to be made in a simple, inexpensive and dependable manner.

Another object of the present invention is to provide a tapered roller bearing kit in accordance with the preceding object in which the tapered roller bearing assemblies are spaced apart by a spacer extending therebetween and received in the hub of the intermediate gear with the internal bore in the intermediate gear also receiving the cup component of the tapered roller bearing assembly which forms the outer race of the tapered roller bearing assembly. The spacer and cone or inner race of the tapered roller bearing assemblies are positioned on a bolt-type shaft which replaces the conventional existing intermediate shaft and is received in adaptors or bushings in opposite walls of the transfer case with the bolt-type shaft having a head at one end and a lock nut at the other to enable adjustment of the preload on the bearing assemblies.

A further object of the present invention is to provide a tapered roller bearing kit in accordance with the preceding objects in which the lock plate on the transfer case normally used to retain the intermediate gear shaft in place in the transfer case is also used to retain an adaptor bushing supporting one end of the bolt-type shaft in the transfer case with the other end of the bolt-type shaft also being received in an adaptor bushing with the two bushings being inserted into the hollow bosses in opposite walls of the transfer case which normally receive the intermediate gear shaft.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
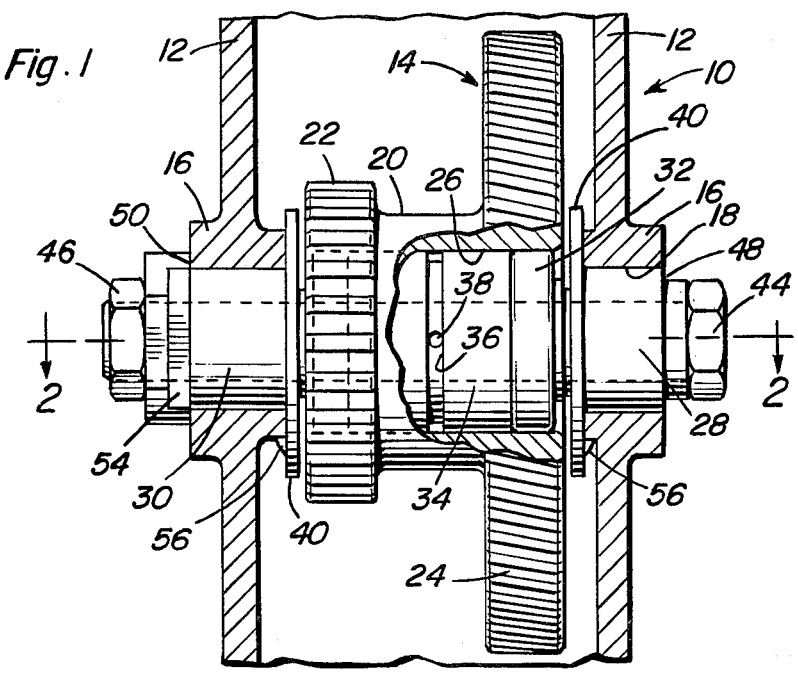
FIG. 1 is an elevational view, with portions broken away, of the tapered roller bearing assembly of the present invention installed in a transfer case and rotatably supporting an intermediate gear therein.

Referring now specifically to the drawings, the existing structure of the transfer case is generally designated by numeral 10 with opposed walls 12 being illustrated in parallel relation with an intermediate gear 14 disposed therebetween. As illustrated, the opposed walls 12 each include a hollow boss 16 therein having an internal bore 18 with the internal bores 18 in the opposite walls 12 being of the same diameter and the shape and configuration of the bosses and transfer case walls being conventional in construction. Also, the intermediate gear 14 is of conventional construction and includes a central hub 20 of cylindrical configuration with a relatively small gear 22 at one end thereof and a relatively larger gear 24 at the other end thereof with these gears being meshed with other gears in the transfer case in a well-known manner. The structure illustrated is that found in the transfer case of a Jeep such as Model CJ-5.

Normally, the intermediate gear 14 is journaled on an intermediate gear shaft (not shown) by a pair of loose needle bearing assemblies at each end of the hub 20 with the outer race of the needle bearing assemblies being the internal bore 26 of the intermediate gear 14 and the internal race of the loose needle bearing assemblies being the external surface of the intermediate gear shaft. When replacing these components, it is necessary to shift the transfer case to neutral, drain the oil from the transfer case and remove the transfer case pan at the bottom of the transfer case. The lock plate on the backside of the transfer case which retains the intermediate shaft in place is then removed and the intermediate shaft is removed by tapping the shaft longitudinally rearwardly so that it slides out of the internal bores 18 in the bosses 16 of the transfer case 10. Removal of the intermediate shaft allows the intermediate gear 14, the needle bearings and thrust washers between the intermediate gear 14 and the interior of the bosses 16 to drop out of the bottom of the transfer case. Normally, a new intermediate gear, intermediate shaft, thrust washers and needle bearing assemblies are reassembled and the transfer case can be used for another period of time until it is necessary to replace these components again due to the excessive wear.

In the present invention, a kit is provided which includes a step bushing 28 which is inserted in the bore 18 in the boss 16 of the front wall 12 of the transfer case 10 and a shoulder lock bushing 30 is inserted into the bore 18 of the boss 16 on the rear wall 12 of the transfer case 10. A pair of longitudinally spaced tapered roller bearing assemblies 32 are positioned in the ends of the internal bore 26 of the hub 20 of the intermediate gear 14 with a bearing spacer 34 positioned therebetween. The bearing spacer 34 is cylindrical in construction and closely fits the internal bore 26 of the intermediate gear 14 and the center periphery of the spacer 34 is provided with a groove 36 communicating with radial oil holes 38 enabling passage of lubricating oil in these components. Thrust washers 40 are positioned between the ends of the intermediate gear 14 and the bosses 16 with the thrust washers being substantially the same as those used in the conventional arrangement.

Figure 2:
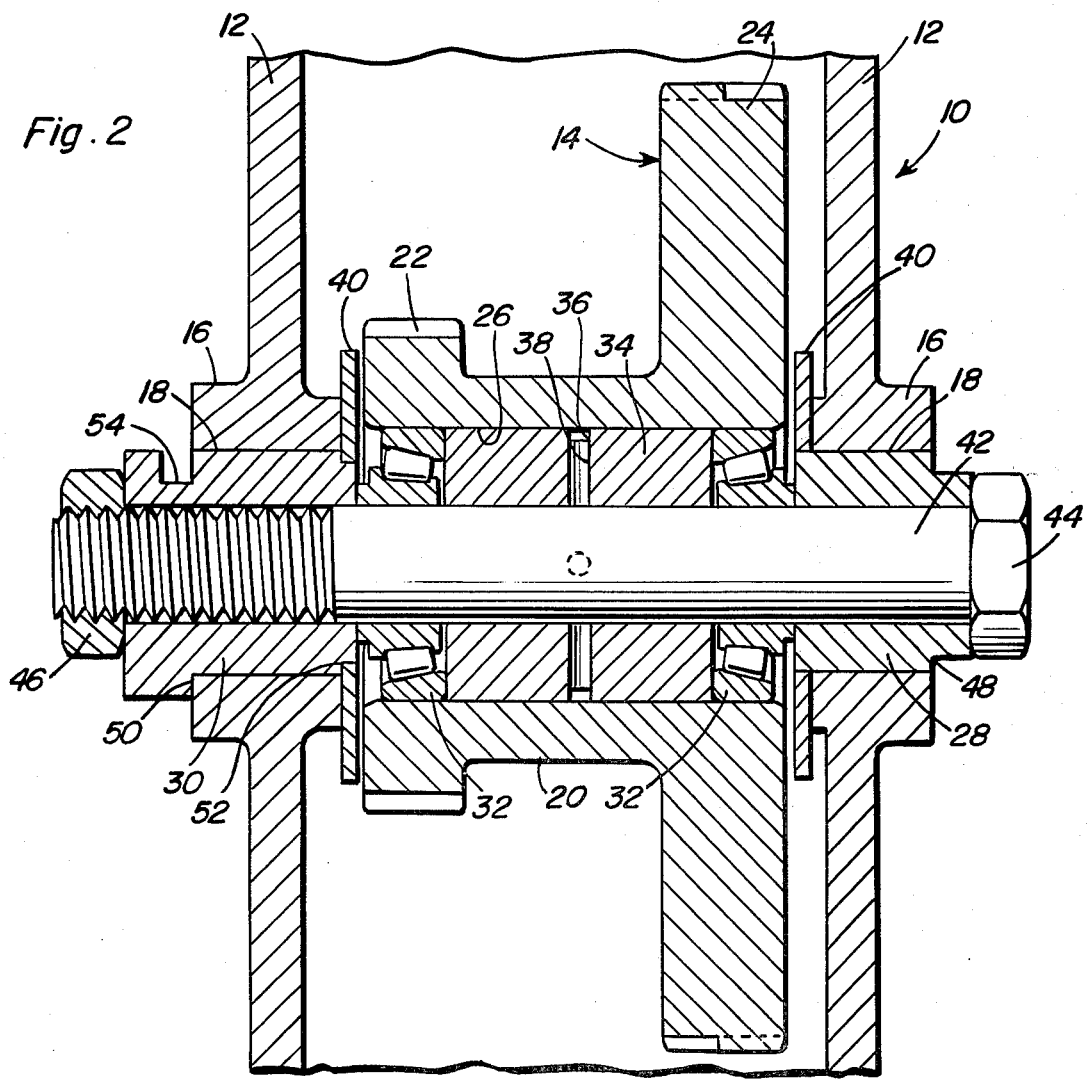
FIG. 2 is a longitudinal, sectional view, on an enlarged scale, taken substantially upon a plane passing along section line 2—2 on FIG. 1, illustrating further structural details of the kit and the relationship of the components thereof to the intermediate gear and transfer case.

An elongated bolt-type shaft 42 extends through the bushings 28 and 30, the tapered roller bearing assemblies 32 and the spacer 34 with the bolt-type shaft 42 including a polygonal head 44 at one end engaging the outer end of the bushing 28 and a locking nut 46 threaded onto the other end in engagement with the shoulder lock bushing 30 as illustrated in FIG. 2.

As illustrated, the step bushing 28 includes a shoulder 48 spaced from the outer end thereof which is generally aligned with the external end of the boss 16 and the step bushing 28 is inssserted into the bore 18 of the boss 16 in the front wall 12 of the transfer case 10 from inside the case with the small or stepped end of the bushing toward the front of the case. The old intermediate shaft may be used as a driver against the inner or rearward end of the bushing 28 to drive it into the bore 18 with the inner end of the step bushing 28 projecting approximately 1/16 inch beyond the inner end of the boss 16. In the final position of the bushing 28, the shoulder 48 is generally aligned with the forward end of the boss 16 and the rearward end of the bushing 28 protrudes approximately 1/16 inch beyond the inner end of the boss 16. The shoulder lock bushing 30 includes an inwardly extending shoulder 50 spaced from the outer end thereof so that when the bushing 30 is inserted into the boss 16 in the rear wall 12 of the case 10, the shoulder 50 will contact the end of the boss 16 and limit the inward movement of the bushing 30. The inner end of the bushing 30 is provided with a peripheral shoulder 52 on the exterior thereof which is generally aligned with the inner end of the boss 16 as illustrated in FIG. 2. The two bushings 28 and 30 have bores extending therethrough which are aligned in relation to each other and the shoulder lock bushing 30 is provided with a transversely extending notch or groove 54 at the inner end portion of the enlarged end portion of the bushing 30 which defines the shoulder 50 for receiving the original lock plate which is positioned in the groove 54 and secured to the rear wall 12 of the transfer case 10 in exactly the same manner as it was secured in place to hold the conventional intermediate shaft in the transfer case.

After the two bushings 28 and 30 have been assembled into the transfer case, the two thrust washers 40 are then assembled on the protruding inner ends of the bushings. Heavy grease may be used to retain the thrust washers 40 in position and the projecting lugs or tangs 56 are disposed outwardly for reception in the existing indentations or slots provided in the interior of the transfer case. The thrust washers 40 are conventional and are associated with the transfer case in the same manner as they were in the conventional installation.

The intermediate gear, bearing assemblies and spacer are then assembled by placing the cup or external race of one of the bearing assemblies in one end of the intermediate gear with the bearing spacer then being inserted from the other end and the other cup or external race of the tapered roller bearing assembly being inserted into the other end of the bore 26 of the intermediate gear 14. The assembled gear, bearings and spacer is then moved upwardly into the transfer case so that the bore through the tapered roller bearing assemblies and the spacer is in alignment with the bores through the bushings 28 and 30. The bolt-type shaft 42 is then inserted through the bushing 28 and thrust washer thereon, the bearings, bearing spacer and bushing 30 from the front to the rear with the head 44 of the bolt disposed to the front and ultimately engaging the forward end of the bushing 28. The self-locking nut 46 is then applied to the bolt-type shaft 42 and tightened until the bearings 32 are preloaded to a predetermined torque such as 90 pounds torque. To complete the job, the transfer case pan is attached and appropriate lubricant placed into the transfer case in a well-known manner.

With this arrangement, a partially worn intermediate gear 14 can usually be used but the intermediate shaft and loose needle bearings are discarded. New thrust washers are usually provided, but they are the same as the conventionally existing thrust washers and the adapter bushings may be constructed with different external diameters since transfer cases conventionally are provided with bores 18 in the walls thereof which in some instances are 1¼ inch in diameter and in other instances 1⅛ inch in diameter. Thus, the adpater bushings 28 and 30 may be constructed with an external diameter to fit the respective internal bores 18 in the bosses 16 in the transfer case. Replacement of the loose needle bearings with two tapered roller bearings results in less friction, substantially complete elimination of noise at any RPM thereby reducing wear and increasing the useful life of the bearing assemblies. When necessary, the tapered roller bearings can be easily replaced at about one-fourth of the cost of the original gear, intermediate shaft and needle bearings. The spacer, bushings, bolt-type shaft and roller bearing assemblies together with the thrust washers provide a complete conversion kit for a gear in a transfer case resulting in less friction, noise, wear and expense of frequent replacement of original needle bearing and related original equipment parts.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A kit for converting an intermediate gear in a transfer case from a needle bearing supported gear to a tapered roller bearing supported gear comprising a pair of tapered roller bearing assemblies adapted to be received in the internal bore of an intermediate gear, a spacer adapted to be interposed between the bearing assemblies, an elongated bolt-type shaft adapted to extend through aligned bores in opposite walls of a transfer case, the bearing assemblies and spacer, and a pair of adapter bushings adapted to be received in the bores in the opposite walls of the transfer case and adapted to receive the bolt-type shaft, said bolt-type shaft including means adapted to engage the outer ends of the bushings to enable the supporting assembly for the intermediate gear to be retained in position and the bearing assemblies preloaded by exerting predetermined axial force thereon, one of said bushings including an outwardly offset peripheral shoulder adjacent the axial outer end adapted to engage the exterior of the transfer case to limit movement of said one bushing inwardly of the transfer case, said bushing shoulder including a transversely extending groove communicating with a portion of the outer periphery thereof and adapted to receive a lock plate attached to the transfer case to lock said one bushing to the transfer case thereby securing the bolt-type shaft and other components of the support for the intermediate gear and the intermediate gear itself within the transfer case.

2. The structure as defined in claim 1 wherein each of said bearing assemblies includes an outer cup defining an outer race having the inner axial end adapted to engage the spacer and an inner cone defining an inner race with the inner axial end of the cone adapted to be spaced from the spacer and the outer axial end of the cone adapted to be engaged by a bushing, each bearing assembly also including tapered roller members interposed between the cup and cone with the larger diameter of each roller being disposed axially outwardly thereby enabling preloading of the bearing assemblies by exerting axial pressure sure inwardly on the cones of the bearing assemblies by biasing the bushings toward each other, said means on the bolt-type shaft for engaging the bushings includes a head on one end of the shaft and a nut screw threaded on the opposite end of the shaft with the bushing having the groove therein being engaged by the nut.

3. A kit for converting an intermediate gear in a transfer case from a loose needle bearing supported gear to a tapered roller bearing supported gear comprising a pair of tapered roller bearing assemblies adapted to be received in the internal bore of an intermediate gear, a spacer adapted to be interposed between the bearing assemblies, an elongated bolt-type shaft adapted to extend through aligned bores in opposite walls of a transfer case, the bearing assemblies an spacer, and a pair of adapter bushings adapted to be received in the bores in the opposite walls of the transfer case and adapted to receive the bolt-type shaft, said bolt-type shaft including a head at one end adapted to engage the outer end of one of the bushings and a nut screw threaded on the other end and adapted to engage the outer end of the other bushing to enable the supporting assembly for the intermediate gear to be retained in position and the bearing assemblies preloaded by exerting predetermined axial force thereon, each of said bearing assemblies including an outer cup defining an outer race having the inner axial end adapted to engage the spacer and an inner cone defining an inner race with the inner axial end of the cone adapted to be spaced from the spacer and the outer axial end of the cone adapted to be engaged by a bushing, each bearing assembly also including tapered roller members interposed between the cup and cone with the larger diameter of each roller being disposed axially outwardly thereby enabling preloading of the bearing assemblies by exerting axial pressure inwardly on the cones of the bearing assemblies by tightening the nut on the bolt-type shaft thereby biasing the bushings toward each other, one of said bushings including an outwardly offset peripheral shoulder adjacent the axial outer end adapted to engage the exterior of the transfer case to limit movement inwardly of the transfer case, said bushing shoulder including a transversely extending groove communicating with a portion of the outer peiphery thereof and adapted to receive a lock plate attached to the transfer case to lock the shouldered bushing to the transfer case thereby securing the bolt-type shaft and other components of the support for the intermediate gear and the intermediate gear itself within the transfer case.

4. The method of converting the intermediate gear supporting structure in a transfer case of a vehicular gear box from a supporting structure employing loose needle bearings in which the inner surface of the bore in the intermediate gear forms an outer race for the needle bearings and the intermediate shaft forms an inner race of the needle bearings to a tapered roller bearing supporting structure for the intermediate gear comprising the steps of removing the intermediate shaft from the aligned bores in the opposite walls of the transfer case, removing the intermediate gear and needle bearing assemblies along with the thrust washers from the transfer case, discarding the intermediate shaft, thrust washers and needle bearing assemblies, inserting adapter bushings in the bores in the opposite walls of the transfer case, positioning thrust washers at the inner ends of the bushings, inserting a tapered roller bearing assembly in the bore at one end of the intermediate gear, inserting a spacer in the opposite end of the bore in the intermediate gear and inserting a second tapered roller bearing assembly in the opposite end of the bore in the intermediate gear with the spacer between the tapered roller bearing assemblies, positioning the assembled intermediate gear, spacer and roller bearing assemblies in alignment with the bores through the bushins, inserting a bolt-type shaft through the bushings, bearing assemblies and spacer with the head of the bolt-type shaft engaging one of the bushings, applying a threaded nut to the end of the bolt-type shaft remote from the headed end and tightening it to a predetermined preload on the tapered roller bearing assembies.

5. The method as defined in claim 4 wherein the step of inserting the bushings into the bores in the transfer case includes the step of locking one of the bushings in relation to the transfer case.

* * * * *